(12) United States Patent
Chang

(10) Patent No.: US 7,494,234 B2
(45) Date of Patent: Feb. 24, 2009

(54) BACKLIGHT MODULE

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 147 days.

(21) Appl. No.: 11/440,378

(22) Filed: May 24, 2006

(65) Prior Publication Data

US 2007/0030566 A1 Feb. 8, 2007

(51) Int. Cl.
*F21V 9/14* (2006.01)
(52) U.S. Cl. .......................... 362/19; 359/437; 427/163; 349/61; 349/62; 349/63; 349/64; 349/65; 349/66; 349/67; 349/68; 349/69; 349/70; 349/71
(58) Field of Classification Search ........................ None
See application file for complete search history.

(56) References Cited

U.S. PATENT DOCUMENTS 5,422,756 A * 6/1995 Weber ........................ 359/487
5,982,540 A * 11/1999 Koike et al. .................. 359/487
6,025,897 A * 2/2000 Weber et al. ................... 349/96
6,079,841 A * 6/2000 Suzuki ........................ 362/616
6,222,598 B1 4/2001 Hiyama et al.
2002/0149853 A1* 10/2002 Liu et al. ..................... 359/619
2004/0114065 A1* 6/2004 Yu et al. ........................ 349/61

FOREIGN PATENT DOCUMENTS

CN 1248714 A 3/2000

* cited by examiner

*Primary Examiner*—Ismael Negron
*Assistant Examiner*—Danielle Dunn
(74) *Attorney, Agent, or Firm*—Frank R. Niranjan

(57) ABSTRACT

A polarizer includes a first prism plate having a plurality of first micro-prisms; a polarizing film formed on surfaces of the first micro-prisms; and a second prism plate having a plurality of second micro-prisms, the micro-prisms of the first prism plate and the micro-prisms of the second prism plate meshed with each other and integrated the polarizing film therebetween, the polarizing film being in direct contact with the first prism plate and the second prism plate. Furthermore, a method for manufacturing the polarizer and a backlight module using the polarizer is also provided.

9 Claims, 2 Drawing Sheets

BACKLIGHT MODULE

TECHNICAL FIELD

The present invention relates to a polarizer, a method for manufacturing the same and a backlight module, and more particularly to a polarizer using a polarizing film used in a backlight module, a method for manufacturing the same and a backlight module using the same.

BACKGROUND

In recent years, LCD devices have become widely used in fields such as mobile phones, vehicular displays, PDAs (Personal Digital Assistant) and TVs. A typical LCD device includes an LCD panel and a backlight module mounted under the LCD panel for supplying light beams thereto. Therefore, the performance of the backlight module is an important factor of the display quality of an LCD device. Important characteristics of the backlight module include its high brightness, low cost, low power consumption, and thin and light design. High brightness and uniform illumination help an LCD provide good display performance.

FIG. 6 represents a typical backlight module 10 comprises a light guide plate (LGP) 12, a light source 14, a quarter wave plate 13, an upward prism plate 16 and a downward prism plate 18. The quarter wave plate 13, the LGP 12, the upward prism plate 16, the downward prism plate 18 are stacked continuously in that order from bottom to top. The LGP 12 defines a light incident surface 121, a light emitting surface 122 adjoining the light incident surface 121, and a bottom surface 123 opposite to the light emitting surface 122. The light source 14 is placed next to the light incident surface 121. The quarter wave plate 13 comprises a reflective film (not shown) on a backing surface 132 thereof.

The upward prism plate 16 includes a plurality of uniform upward micro-prisms 162 on a surface thereof opposite from the LGP 12, the downward prism plate 18 comprises a plurality of downward micro-prisms 182, and the micro-prisms 182 substantially mesh with the upward micro-prisms 162, but leaving a gap 19 therebetween.

Due to the foresaid structure of the backlight module 10, the p-polarized light of light coming from the LGP 12 can pass through the downward micro-prisms 182, while the s-polarized light thereof is reflected and converted into p-polarized light via the quarter wave plate 13 and then pass through the downward micro-prisms 182.

However, when defining the gap 19 between opposite surfaces 163 and 183 of the upward micro-prisms 162 and the downward micro-prisms 182, a locating mechanism is required for locating the downward prism plate 18. The structure of the backlight module 10 is thereby complicated, more time and high locating precision are required for the assembly. Furthermore, a difference of the each of the refractive indices of the prism plates 16, 18 and the gap 19 is in the range from 0.001 to 0.2. It's difficult to select suitable materials for the prism plates 16, 18.

What is needed, therefore, is a polarizer which has simple structure, can be assembled readily.

What is also needed, therefore, is a method for manufacturing the above-described polarizer.

What is also needed, therefore, is a backlight module using the above-described polarizer.

SUMMARY

In a preferred embodiment, a polarizer comprises a first prism plate having a plurality of first micro-prisms; a polarizing film formed on surfaces of the first micro-prisms; and a second prism plate having a plurality of second micro-prisms, the first micro-prisms of the first prism plate and the second micro-prisms of the second prism plate meshed with each other and integrated the polarizing film therebetween, the polarizing film being in direct contact with the first prism plate and the second prism plate.

In another preferred embodiment, a method for manufacturing a polarizer comprises the steps of: providing a first prism plate having a plurality of first micro-prisms; forming a polarizing film on surfaces of the first micro-prisms of the first prism plate; providing a second prism plate having a plurality of second micro-prisms; meshing the second micro-prisms of the second prism plate with the first micro-prisms of the first prism plate to integrate the polarizing film therebetween, with the polarizing film being in direct contact with the first prism plate and the second prism plate.

In another preferred embodiment, a backlight module using the above-described polarizer comprises an LGP, a light source, a polarizer, a reflector and a quarter wave plate. The polarizer, the LGP, the quarter wave plate, and the reflector are stacked continuously in that order from top to bottom. The LGP defines a light incident surface, a light emitting surface adjoining the light incident surface, and a bottom surface opposite to the light emitting surface. The light source is placed next to the light incident surface.

Other advantages and novel features will become more apparent from the following detailed description when taken in conjunction with the accompanying drawings, in which:

BRIEF DESCRIPTION OF THE DRAWINGS

Many aspects of the present invention can be better understood with reference to the following drawings. The components in the drawings are not necessarily to scale, the emphasis instead being placed upon clearly illustrating the principles of the present invention. Moreover, in the drawings, like reference numerals designate corresponding parts throughout the several views.

The exemplifications set out herein illustrate at least one preferred embodiment of the invention, in one form, and such exemplifications are not to be construed as limiting the scope of the invention in any manner.

DETAILED DESCRIPTION OF PREFERRED EMBODIMENTS

Embodiments of the present invention will now be described in detail below and with reference to the drawings.

Figure 1:
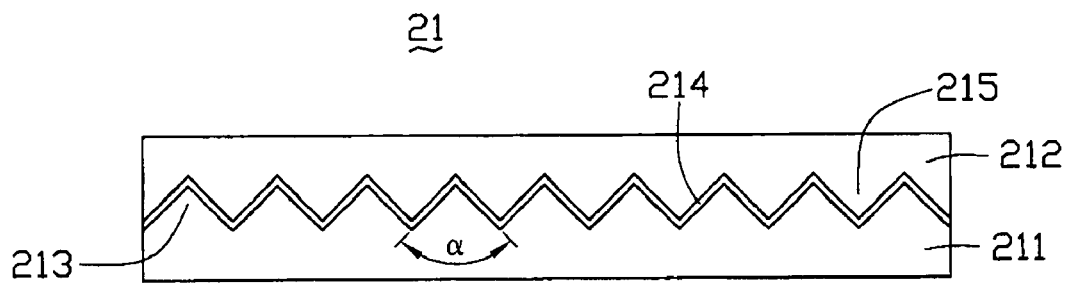
FIG. 1 is a schematic view of a polarizer in accordance with a preferred embodiment.

Referring to FIG. 1, a polarizer 21 according to a preferred embodiment is provided. The polarizer 21 comprises a first prism plate 211, a second prism plate 212, and a polarizing film 214. The first prism plate 211 has a plurality of micro-prisms 213. The second prism plate 212 has a plurality of micro-prisms 215. The micro-prisms 213, 215 each has a 90 degree apex angle α. The first and second prism plates 211, 212 are made from essentially the same material such as glass material or transmission plastic material. The polarizing film 214 can be made from a material selected from the group comprising magnesium difluoride ($MgF_2$), silicon dioxide (SiO$_2$), and tantalum pentoxide (Ta$_2$O$_5$). The micro-prisms 213 of the first prism plate 211 and the micro-prisms 215 of the second prism plate 212 mesh with each other and integrate the polarizing film 214 therebetween. In accordance with different polarizing films 214, only one of p-polarized light and s-polarized light can pass through the polarizer 21, while the other one of the p-polarized light and the s-polarized light is reflected.

Figure 2:
FIGS. 2-4 schematically illustrate a method for manufacturing the polarizer of FIG. 1.
Figure 3:
Figure 4:

Referring to FIGS. 2-4, a method for manufacturing the polarizer 21 according to another preferred embodiment is provided. The method comprises the steps of:

providing two flat plates, the flat plates can be made from glass material or transmission plastic material;

forming a first prism plate 211 having a plurality of micro-prisms 213 by etching one of the two flat plates, each of the micro-prisms 213 having a 90 degree apex angle;

forming a polarizing film 214 on surfaces of the micro-prisms 213, the polarizing film 214 only transmitting p-polarized light and being made from a material selected from group comprising MgF$_2$, SiO$_2$ and Ta$_2$O$_5$;

forming a second prism plate 212 having a plurality of micro-prisms 215 by etching the other one of the two flat plates, each of the micro-prisms 215 having a 90 degree apex angle;

meshing the second prism plate 212 with the first prism plate 211 to integrate the polarizing film 214 therebetween.

It is noted that, in other embodiments, the polarizing film 214 also can be plated on surfaces of the micro-prisms 215 of the second prism plate 212. The first prism plate 211 and the second prism plate 212 can be formed by injection molding.

Figure 5:
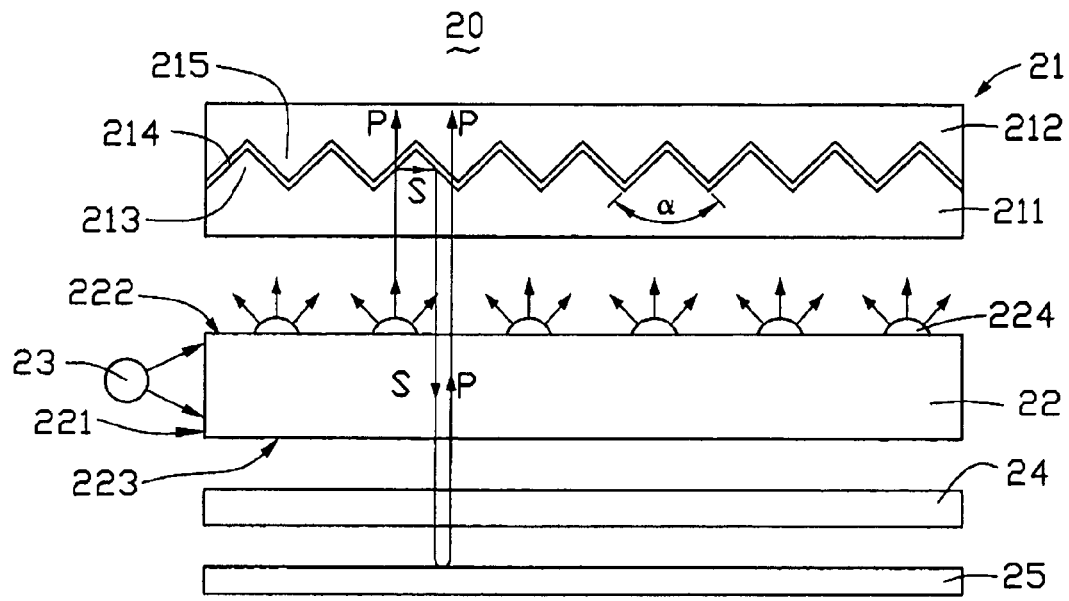
FIG. 5 is a schematic view of a backlight module using the polarizer of FIG. 1.
Figure 6:
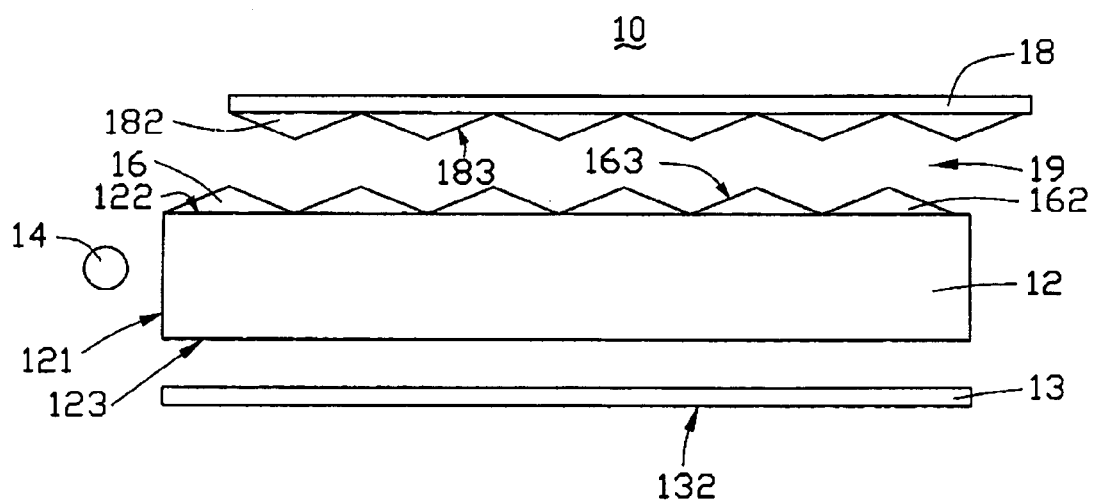
FIG. 6 is a schematic view of a typical backlight module.

Referring to FIG. 5, a backlight module 20 using the polarizer 21 of FIG. 1 according to another preferred embodiment is provided. The backlight module 20 comprises the polarizer 21, an LGP 22, a light source 23, a quarter wave plate 24 and a reflector 25. The polarizer 21, the LGP 22, the quarter wave plate 24, and the reflector 25 are stacked continuously in that order from top to bottom. The LGP 22 defines a light incident surface 221, a light emitting surface 222 adjoining the light incident surface 221, and a bottom surface 223 opposite to the light emitting surface 222. The light emitting surface 222 defines a plurality of microstructure 224. The light source 23 is placed next to the light incident surface 221.

In operation, light beams emitted from the light source 23 enter the LGP 22 through the light incident surface 221, and then exit out from the light emitting surface 222 of the LGP 22. The exiting directions of the light beams are controlled by the microstructure 224 of the light emitting surface 222. When the light beams exit from the light emitting surface 222 reach the polarizing film 214 of the polarizer 21, only p-polarized light beams pass through the polarizing film 214. The s-polarized light beams are reflected back through the LGP 22 and pass through the quarter wave plate 24 to arrive at the reflector 25. The s-polarized light beams are then reflected by the reflector 25, and pass back through the quarter wave plate 24. The s-polarized light beams are therefore converted to p-polarized light beams. The converted p-polarized light beams pass through the LGP 22 and the polarizer 21. The converted p-polarized light beams together with the aforementioned p-polarized light beams form a light source of a liquid crystal display.

The shape of the microstructure 224 is selected from group comprising trigonal strip shaped, semicircular strip shaped, and mesh point structure. The LGP 22 is flat plate-shaped or wedge-shaped, and can be made from material such as polycarbonate (PC), polymethylmethacrylate (PMMA), etc. The light source 23 employs light emitting diode (LED) or cold cathode fluorescent lamp (CCFL). Furthermore, the quarter wave plate 24 includes a first surface far from the LGP 22 and the reflector 25 can be a reflective sheet or be simplified as a reflective film formed on the first surface of the quarter wave plate 24.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
   a light guide plate, the light guide plate comprising a light incident surface, a light emitting surface adjoining the light incident surface, and a bottom surface opposite to the light emitting surface;
   a light source placed next to the light incident surface;
   a polarizer, the polarizer comprising a first prism plate having a plurality of first micro-prisms; a polarizing film formed on surfaces of the first micro-prisms; and a second prism plate having a plurality of second micro-prisms, the first micro-prisms of the first prism plate and the second micro-prisms of the second prism plate meshed with each other with the polarizing film integrated therebetween, the polarizing film being in direct contact with the first prism plate and the second prism plate;
   a reflector; and
   a quarter wave plate; wherein
   the polarizer, the light guide plate, the quarter wave plate, and the reflector are stacked continuously in that order from top to bottom.

2. The backlight module in accordance with claim 1, wherein the first and second prism plates are made from essentially the same material.

3. The backlight module in accordance with claim 1, wherein the first and second prism plates are both made from glass material.

4. The backlight module in accordance with claim 1, wherein the first and second prism plates are both made from transmission plastic material.

5. The backlight module in accordance with claim 1, wherein the micro-prisms each have a 90 degree apex angle.

6. The backlight module in accordance with claim 1, wherein the polarizing film is made from a material selected from the group comprising MgF2, SiO2, and Ta2O5.

7. The backlight module in accordance with claim 1, wherein the light emitting surface of the light guide plate has a plurality of microstructure formed thereon.

8. The backlight module in accordance with claim 1, wherein the reflector is a reflective sheet.

9. The backlight module in accordance with claim 1, wherein the quarter wave plate comprises a first surface far from the light guide plate and the reflector is a reflective film formed on the first surface of the quarter wave plate.

* * * * *